United States Patent
Zanders

(10) Patent No.: US 7,729,194 B2
(45) Date of Patent: Jun. 1, 2010

(54) BACKUP FOR CIRCUITS HAVING VOLATILE STATES

(75) Inventor: Gary V. Zanders, Fairview, TX (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 110 days.

(21) Appl. No.: 12/188,694

(22) Filed: Aug. 8, 2008

(65) Prior Publication Data

US 2009/0039708 A1    Feb. 12, 2009

Related U.S. Application Data

(60) Provisional application No. 60/954,799, filed on Aug. 8, 2007.

(51) Int. Cl.
*G11C 5/14* (2006.01)
(52) U.S. Cl. .................. 365/229; 365/228; 365/185.08
(58) Field of Classification Search ................. 365/226, 365/228, 229, 185.08, 185.09, 233.1
See application file for complete search history.

Primary Examiner—Gene N. Auduong
(74) Attorney, Agent, or Firm—North Weber & Baugh LLP

(57) ABSTRACT

An electrical circuit contains volatile states that are lost without continued application of power to circuit elements to preserve their volatile states. A first power source in the circuit provides power to the volatile state circuit for holding and preserving their volatile states. A power selection circuit is coupled to the circuit elements and has a plurality of selectable modes. A first mode of operation of the power selection circuit is selected when the circuit elements are to be operated at a first power level via the first power source which constitutes a first mode of operation. A second mode of operation is selected when the volatile state circuit elements are to be operated under a condition where the first power source is inactivated, such as, for example, during a circuit backup or standby operation. During the second mode of operation, the circuit elements volatile states are preserved via a power selection circuit that provides power from a second power source at a second power level, different from the first power level, to the volatile state circuit elements in place of the first power source.

24 Claims, 4 Drawing Sheets

BACKUP FOR CIRCUITS HAVING VOLATILE STATES

CROSS REFERENCE TO RELATED PATENT APPLICATIONS

This application claims priority to U.S. provisional application Ser. No. 60/954,799, entitled "Low Leakage RAM Backup", filed Aug. 8, 2007, which application is incorporated herein by reference in its entirety. This application is related to U.S. patent application Ser. No. 12/188,622, filed on Aug. 8, 2008 and entitled, "Backup for Volatile State Retention in Absence of Primary Circuit Power", and is incorporated here in its entirety by its reference.

BACKGROUND

A. Technical Field

The present invention relates generally to digital circuit design, and more particularly, to the design of volatile circuits that contain volatile data states that may be lost without the continued application of applied power. An example of such a volatile circuits are digital memory circuits capable of retaining the data state of each memory cell during power-down periods in which the primary power source for the memory circuit is uncoupled from the memory circuit or, otherwise, interrupted or rendered inactive to the memory circuit. A particular example of such a memory circuit is a random access memory (RAM) circuit.

B. Background of the Invention

An ongoing trend to reduce the size of the components or elements or devices in digital integrated circuits is leading to geometries that enable the operation of circuits having volatile circuit elements, such as, for example, memory cells, flip flop devices, etc., using a lowered power level of about 1.8 volts. Power at this level is typically provided from a conventional unregulated external power source of about 3.0+/−10% volts using an internal low dropout (hereinafter "LDO") power supply regulator. Nonetheless, when such low voltage devices are inactive or turned off, the leakage currents exhibited are substantially large relative to the same kind of devices configured using earlier versions of CMOS technology. Such earlier devices typically operate from an unregulated external power source of about 3.0 volts with lower leakage current.

In modern CMOS processes, adequately low standby currents cannot be achieved simply by making all circuit nodes in such a circuit design static because of these excessive leakage currents in smaller geometry devices when placed in an "off" or inactive state. Previous solutions to this problem have concentrated on employing analog circuit techniques to reduce these leakage currents. Examples of these techniques are the employment of a reverse substrate bias and the interposition of much less leaky high voltage transistors in each leakage path, such as employing thicker gate oxide, deeper junctions, and larger dimension devices, such as transistor components or elements. These solutions are complex and do not guarantee the desired results.

What is need is a way to provide for memory circuit backup of their volatile memory states with respect to newer lower voltage operating CMOS circuits employing an approach that provides for lower leakage during periods of circuit power extension or turn-off. The approach here utilizes digital circuit state retention in the absence of normal circuit power or inactivation.

SUMMARY OF THE INVENTION

A novel digital approach is employed to achieve low leakage current based upon two principles. First, primary power is turned off to any circuitry that is not critical to the maintenance of circuit volatile states in a low power mode. Second, employ the least leaky circuits for circuitry that must remain in a powered-up mode such as supplied from a secondary power source while the primary power source is powered-down or inactivated. This may be accomplished in one embodiment by the employment of larger geometry CMOS circuitry during, for example, a backup or standby mode of operation that are of higher voltage operation with lower leakage current, compared to smaller current CMOS geometry with higher current leakage when in off condition. In this connection, operating at higher voltages, these integrated or embedded circuits must be isolated from electrically coupled lower operating voltage circuits. A specific example is that current faster and smaller geometry CMOS devices or elements, such as 1.8 volt low voltage transistors, exhibit about one hundred times more current leakage per unit device width than larger and slower operating 3.3 volt high voltage transistors.

As a specific circuit example with respect to the above mentioned two principals, a volatile circuit in the form of a random access memory (RAM) is a good example, although there are other good examples of volatile circuits that have volatile states to which these principals may be applied, such as for example, any circuit that requires a constant power to maintain stored states in circuit elements or devices, or elements or devices that need to be periodically refreshed, such as those that employ a circuit capacitor, for example, that leak charge that represents a binary state which will fade over time unless the capacitor charge is periodically refreshed. As to the first principal, the only circuit that must remain powered up during circuit power-down or circuit chip inactivation is the RAM core itself. The entire peripheral circuits of the RAM core must be powered-down. As to the second principal, the deployment of high voltage CMOS transistors during the backup or standby mode of operation, particularly those optimized for use in higher voltage input/output pad circuitry, will minimize the amount of current leakage in RAM core array. In following this approach, an internal low dropout (LDO) power supply regulator may be employed. During a normal mode of operation, the RAM core is powered by a low voltage that is compatible with the short-channel low voltage transistors utilized in the memory core. This lower regulated voltage may be derived from a higher, unregulated input power supply that drives the I/O pads employing the LDO. However, in the lower or backup/standby power mode of operation, the LDO is turned off to save circuit current usage. The RAM core remains powered up in this mode of operation when the power supplied to the RAM core may be switched over to a raw (unregulated) high voltage power supply input for continued operation to maintain volatile core memory states.

Thus, one of the key aspects of this disclosure is the deployment of high voltage memory cells, such as, for example, static RAM cells, in the memory core of the circuitry. Each memory cell is built of high voltage MOSFETs which may be powered by an unregulated voltage source, such as, for example, 3 volts+/−10%, which has approximately two orders of magnitude less leakage for an equivalent device or element width as compared to a low voltage MOSFETs, for example, operating at 1.8 volts. This allows for the memory core power supply to be switched to a higher voltage when operating in the backup mode of operation so that the internal LDO, providing low voltage power during the normal mode of operation of the memory cells, may be powered-down or inactivated providing for additional savings in circuit current usage. An input backup signal selects whether the memory array power supply to be connected to the memory core is the low voltage or the high voltage, respectively, depending upon whether there is to be a normal mode of operation or a backup/standby mode of operation. In the backup or standby mode of operation, peripheral circuits of the memory circuit are inactivated because when the low voltage regulated supply is disenabled, these peripheral circuits will lose power. In order to prevent their power loss from corrupting the volatile data states in the memory core, an isolation signal is employed. In the normal mode of operation, the isolate signal is held at a first logic state, such as logic 0 (zero volts). Before power supplied to peripheral circuits is removed, the isolate signal is driven to logic 1 (higher voltage condition or $V_{dd3}$). This isolates the word lines to the memory cells, in particular, by turning on n-channel keeper devices that continually holds the memory word lines at a logic low thereby preventing access into the memory cells. Since the isolate signal and the memory array backup signal are high voltage signals, any circuitry that is engaged by these signals must also be high voltage circuitry.

While the high voltage memory cell has been discussed above, it will be realized by those skilled in the art that, as a backup memory element or cell formed from high voltage MOSFET transistors, for example, providing low current leakage, A MOSFET process can be available to provide a memory cell specifically for low current leakage and are not characterized as high voltage transistors. Therefore, it is important relative to this invention that in the characterization of the backup state retention circuit that the circuit contains elements that form a backup memory cell that is small in size, compared to other on-chip circuitry, and also may additionally provide lower current leakage.

BRIEF DESCRIPTION OF THE DRAWINGS

Reference will be made to an exemplary embodiment of the present invention that is illustrated in the accompanying figures. Those figures are intended to be illustrative, rather than limiting. Although the present invention is generally described in the context of that embodiment, it is not intended by so doing to limit the scope of the present invention to the particular features of the embodiment depicted and described.

DETAILED DESCRIPTION OF THE PREFERRED EMBODIMENTS

Figure 1:
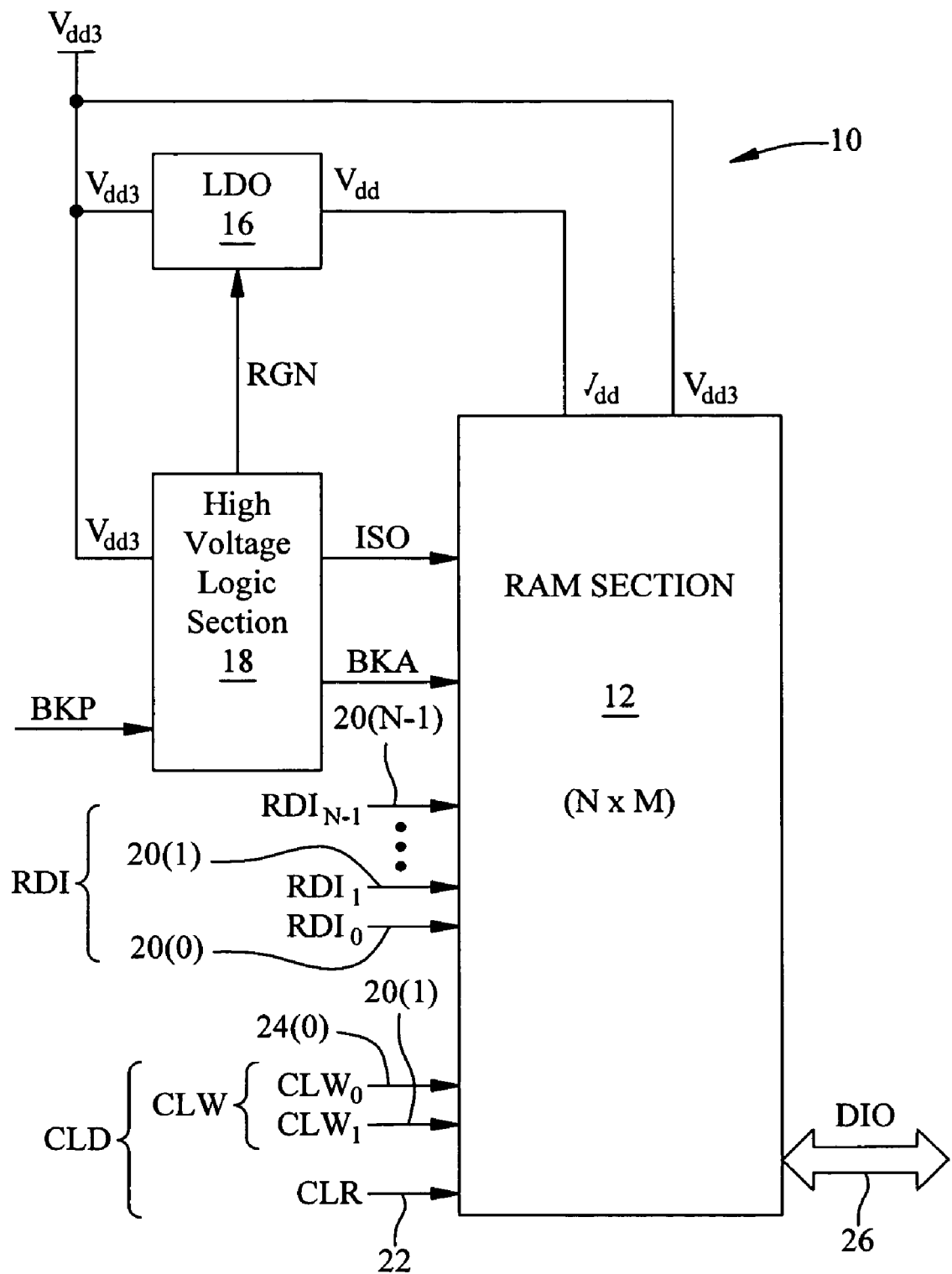
FIG. 1 is an electrical block diagram of a memory circuit that includes one embodiment of a random access memory section exemplifying the teachings of this invention and therefore exhibiting low leakage current during backup operation of the memory circuit.

In the following description, for purpose of explanation, specific details are set forth in order to provide an understanding of the present invention. The present invention may, however, be practiced without some or all of these details. The embodiment of the present invention described below may be incorporated into a number of different electrical components, circuits, devices, and systems. Structures and devices shown in block diagram are illustrative of exemplary embodiments of the present invention and are not to be used as a pretext by which to obscure broad teachings of the present invention. Connections between components within the figures are not intended to be limited to direct connections. Rather, connections between components may be modified, re-formatted, or otherwise changed by intermediary components.

Reference in the specification to "one embodiment" or to "an embodiment" means that a particular feature, structure, characteristic, or function described in connection with the embodiment is included in at least one embodiment of the present invention. The appearance of the phrase "in one embodiment" in various places in the specification does not necessarily constitute plural references to a single embodiment.

In contemporary CMOS processes, adequately low standby currents cannot be achieved simply by making all nodes inside a design static, due to the excessive leakage currents that arise in small-geometry devices in an "off" condition. Previous attempts to solve this problem have concentrated on using analog techniques to reduce the leakage current. Examples of such techniques include the use of reverse substrate bias and the interposition in each leakage path of less leaky, high-voltage devices that have, for example, thicker gate oxides, deeper junctions, and larger dimensions. Such attempted solutions are complex, cumbersome, and of low reliability in achieving the results desired.

By contrast, according to teachings of the present invention, digital circuit state retention in the absence of power is accomplished using techniques that are exclusively digital. The inventive digital approach is governed by a pair of general principles. First, in any low-power mode of operation, power is turned off to any circuit element that is not critical to the maintenance of a given data state. Second, the least leaky circuitry available is employed as the circuit elements that remain fully powered to maintain the given data state.

This pair of inventive principles, when applied to the design of a memory circuit, such as a random access memory (RAM) device, has identifiable consequences.

First, the only circuitry that remains fully powered during backup operation of the memory circuit is the RAM array itself. Any peripheral circuitry to the RAM array, such as integrated on the same semiconductor chip, may be powered down, and measures are undertaken according to this invention to prevent peripheral circuitry power loss from corrupting the data being preserved in the RAM array circuit.

Second, high-voltage MOS field effect transistors that operate reliably on unregulated voltages levels of about 3.0±10% volts exhibit approximately two orders of magnitude less leakage current per unit width than do low-voltage MOS field effect transistors that operate at 1.8 volts. Therefore, according to this invention, the RAM array is constructed entirely of high-voltage CMOS transistors. This will minimize the amount of leakage current in the portion of the memory circuit that is fully powered during backup operation of the memory circuit.

During normal operation, most portions of a memory circuit operate on low-voltage power that is compatible with the types of short-channel, low-voltage, high-speed transistors that are common in such settings. That low-voltage power is derived from an unregulated, high-voltage input power supply using an internal low dropout (LDO) power supply regulator, which, itself, consumes substantial power. Therefore, according to another aspect of the present invention, during backup operation of a memory circuit, the LDO power supply regulator is turned off in order to conserve the overall consumption of power. Being constructed entirely of high-voltage CMOS transistors, the RAM array of the memory circuit is consequently able during backup operation to be switched to an unregulated, high-voltage input power supply in order to preserve any data states therein.

FIG. 1 depicts a typical data storage system that has a single, external, unregulated high-voltage power supply and that generates a primary regulated low-voltage power supply through an on-chip LDO power supply regulator. Logic circuitry necessary to controlling backup operation of the system is built of high-voltage circuitry that is driven during backup operation by the external, unregulated high-voltage power supply. The logic circuitry remains powered at all times, but the majority of the memory system is powered down by turning off the LDO power supply regulator.

In FIG. 1, a memory circuit 10 includes a RAM section 12 that incorporates teachings of the present invention. At the heart of RAM section 12 is an array of random memory access cells that typically are organized into a number N of rows and a number M of columns. The number N of rows and the number M of columns need not be identical, but in an exemplary embodiment of memory circuit 10 disclosed here, N=M=128, whereby RAM section 12 includes in excess of $1.6 \times 10^3$ individual RAM cells. As FIG. 1 suggests, individual RAM cells in RAM section 12 are managed in a conventional manner by potential row driver signals RDI and potential column driver signals CLD, all of which originate elsewhere in memory circuit 10 such as, for example, from circuit elements not shown in FIG. 1, which circuits are not relevant to the description of the present invention.

Potential row driver signals RDI can include an individual row driver signal corresponding to each of the number N of rows of RAM cells in RAM section 12. Each individual row driver signal is presented to RAM section 12 on a corresponding one of a number N of row access leads that are associated with RAM section 12. The presence of any an individual row driver signals on a row access lead of RAM section 12 identifies the corresponding row of RAM cells as a row in which data states may be stored or from which data states may be read. By way of example, potential row driver signals RDI shown in FIG. 1 include an individual row driver signal $RDI_0$ for row 0 that is presented on a row access lead 20(0) for row 0, an individual row driver signal $RDI_1$ for row 1 that is presented on a row access lead 20(1) for row 1, and an individual row driver signal $RDI_{N-1}$ for row N-1 that is presented on a row access lead 20(N-1) for row N-1.

Potential column driver signals CLD can include any of three individual column driver signals that are associated with each of the number M of columns of RAM cells in RAM section 12. In the interest of simplifying FIG. 1, only a single set of these individual column driver signals is shown for a single, typical column of RAM cells. Each individual column driver signal is presented to RAM section 12 on a corresponding one of three column input leads that are associated with each column of RAM cells.

Among the individual column driver signals for the typical column of RAM cells of RAM section 12 is a column read signal CLR. Column read signal CLR for the typical column of RAM cells is presented on a column read lead 22 for the typical column. Column read signal CLR enables the data state to be read from any RAM cell in the typical column that is also in a row of the RAM cells for which a potential row driver signal RDI is simultaneously presented on the row access lead corresponding thereto.

Also, among the individual column driver signals CLD for the typical column of RAM cells of RAM section 12 is a pair of column write signals CLW. The pair of column write signals CLW for the typical column of RAM cells is presented on a corresponding pair of individual column write leads for the typical column. Column write signals CLW enable a corresponding logic 0 data state or a corresponding logic 1 data state to be entered into any RAM cell in the typical column that is also in a row of the RAM cells for which a potential row driver signal RDI is simultaneously presented on the row access lead corresponding thereto. The pair of column write signals CLW shown in FIG. 1 include a column write logic 0 signal $CLW_0$ that is presented on a write logic 0 lead 24(0) for the typical column of RAM cells, and a column write logic 1 signal $CLW_1$ that is presented on a write logic 1 lead 24(1) for that same typical column of RAM cells.

The operation of RAM section 12 using potential row driver signals RDI and potential column driver signals CLD results in the communication of data states on a data transmission bus 26 into and out of RAM section 12. This communications of data states is identified in FIG. 1 as a data input and output signal DIO.

Memory circuit 10 receives power from a conventional, unregulated external power source at an input voltage $V_{dd3}$, which is typically somewhat in excess of about 3.0 volts. Input voltage $V_{dd3}$ is applied to an internal LDO power supply regulator 16, which produces as an output an internally-regulated low-voltage $V_{dd}$ of about 1.8 volts. Internally-regulated low voltage $V_{dd}$ is the power supplied to RAM section 12 during the normal operation of memory circuit 10. Nonetheless, input voltage $V_{dd3}$ is also presented to RAM section 12 for use when internal LDO power supply regulator 16 is not in operation, as for example, during any backup operation of memory circuit 10.

Input voltage $V_{dd3}$ is continuously applied to a high-voltage logic section 18 of memory circuit 10. Responsive to the presence or absence of an input backup signal BKP from elsewhere in memory circuit 10 than from any of the elements thereof shown in FIG. 1, high-voltage logic section 18 manages the functioning relationships among the other elements of memory circuit 10 that are included in FIG. 1. High-voltage logic section 18 does so through a variety of output signals, a select few of which are included in FIG. 1. These include a regulator enable signal RGN that is communicated to internal LDO power supply regulator 16, as well as an isolate signal ISO and a memory array backup signal BKA that are transmitted to RAM section 12 during backup operation of memory circuit 10. Responsive to appropriate of these output signals from high-voltage logic section 18, internal LDO power supply regulator 16 is turned off, and RAM section 12 operates without the benefit of internally-regulated low voltage $V_{dd}$.

Memory circuit 10 is configured so as to minimize the electrical charge consumed as leakage current during any period in which memory circuit 10 is powered down, or inactive, and all of the data states set in RAM section 12 are to be preserved. All circuit elements concerned with the preservation of the data state in RAM section 12 are high-voltage components that exhibit low leakage current.

Figure 2:
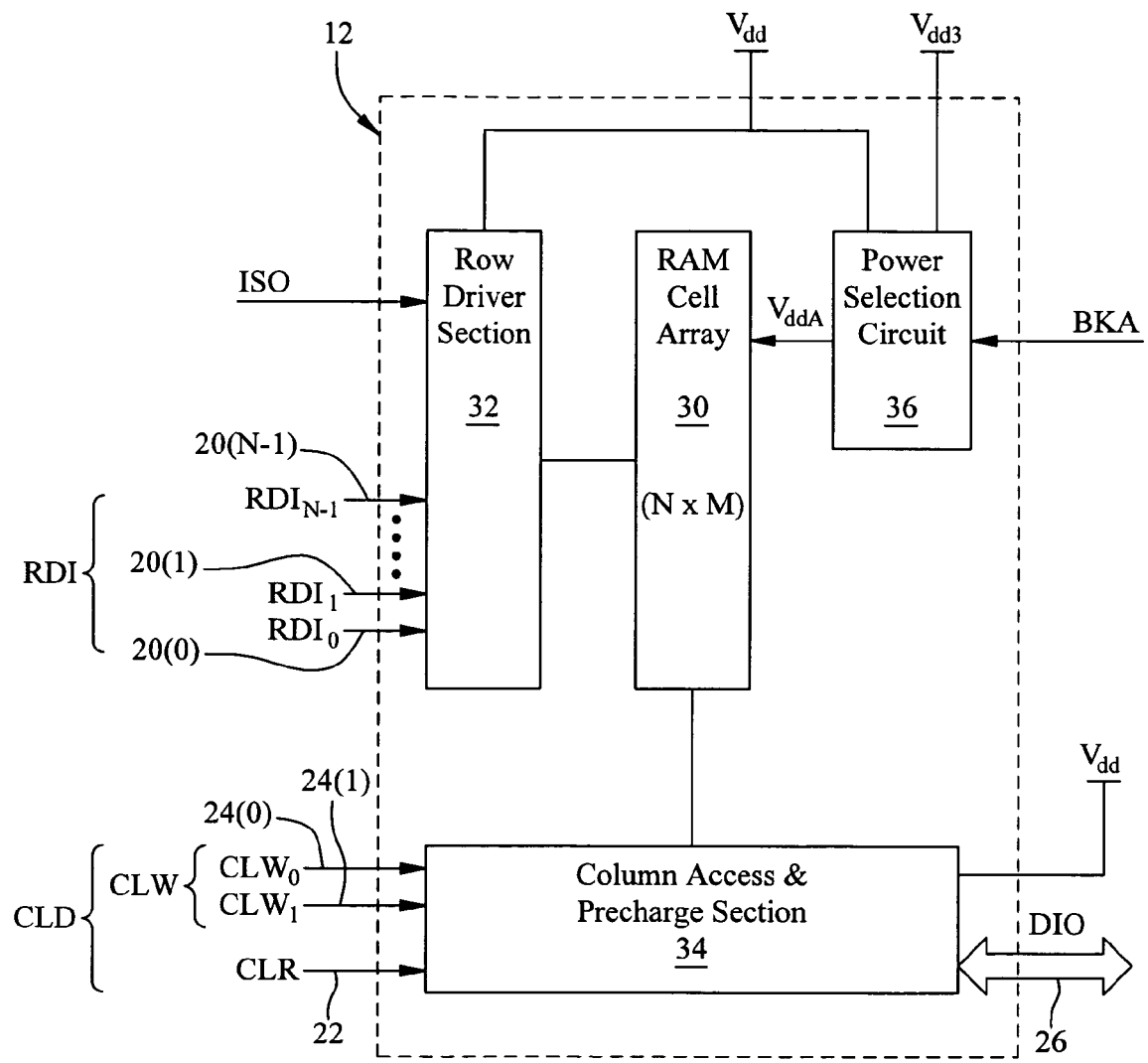
FIG. 2 is an electrical block diagram interrelating significant subsystems of the random access memory section of FIG. 1.

FIG. 2 is a block diagram that depicts the interrelation of significant subsystems in RAM section 12 of FIG. 1. There RAM section 12 can be seen to include as the heart thereof a RAM cell array 30 that includes random memory access cells organized into number N of rows and number M of columns. The functioning of RAM cell array 30 is managed by a row driver section 32 and a column access and precharge section 34 that is placed intermediate, as shown, between RAM cell array 30 and data control signals, such as potential row driver signals RDI and potential column driver signals CLD. Input voltage $V_{dd}$ from internal LDO power supply regulator 16 in FIG. 1 is applied directly, both to row driver section 32, and to column access and precharge section 34 during all periods of normal mode operation of memory circuit 10.

A power selection circuit 36 provides selectively different power levels in RAM section 12 and, therefore, determines the level of an array input voltage $V_{ddA}$ that is provided to power RAM cell array 30. Power selection circuit 36 varies array input voltage $V_{ddA}$ according to whether memory circuit 10 is in a normal mode of operation or in a backup mode of operation. Toward this end, power selection circuit 36 is supplied, at all times, as a backup source of power with input voltage $V_{dd3}$. Whenever available, internally-regulated low-voltage $V_{dd}$ is also supplied to power selection circuit 36, but this can occur only during the normal mode of operation of memory circuit 10, when internal LDO power supply regulator 16 is rendered operational. During the normal mode operation of memory circuit 10, power selection circuit 36 passes internally-regulated low-voltage $V_{dd}$ to RAM cell array 30. Thus, when memory circuit 10 is in normal mode operation, array input voltage $V_{ddA}$ is equal to internally-regulated low-voltage $V_{dd}$.

On the other hand, when memory circuit 10 is to enter the backup mode of operation, responsive to backup signal BKP, shown in FIG. 1, high-voltage logic section 18 generates, among other related signals, memory array backup signal BKA, which is fed directly to power selection circuit 36 in RAM section 12 as shown in FIG. 2. In response to memory array backup signal BKA, power selection circuit 36 switches internally-regulated low-voltage $V_{dd}$ off as the power supplied to RAM cell array 30 and substitutes in place thereof input voltage $V_{dd3}$.

Since input voltage $V_{dd3}$ is generally greater than internally-regulated low-voltage $V_{dd}$, all of the RAM cells in RAM section 12 are built of high-voltage MOS field effect transistors that operate reliably on unregulated input voltage $V_{dd3}$. Thus, during backup mode operation of memory circuit 10, array input voltage $V_{ddA}$ is equal to input voltage $V_{dd3}$, and internal LDO power supply regulator 16 is turned off. This substantially reduces the consumption of power in memory circuit 10 during backup mode of operation.

Figure 3:
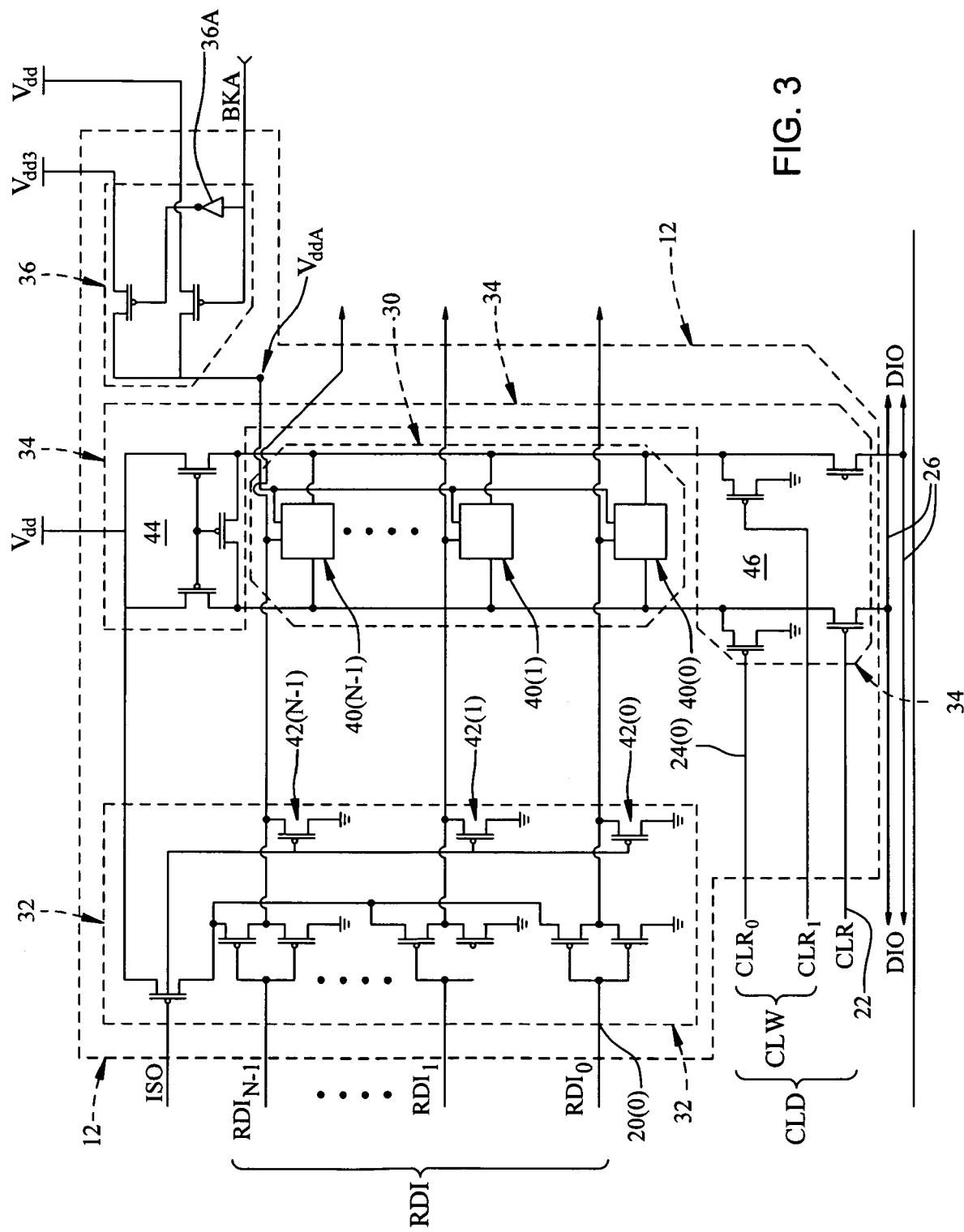
FIG. 3 is a detailed electrical schematic diagram of the random access memory section of FIG. 1 grouped into the subsystems shown in FIG. 2.

FIG. 3 is a detailed electrical schematic diagram of the subsystems of RAM section 12 shown in FIG. 2. All of the transistors in RAM section 12 are high-voltage CMOS transistors that operate reliably on unregulated voltages levels of about 3.0±10% volts.

The column of RAM cell array 30 illustrated in FIG. 3 includes a number N of individual, high-voltage RAM cells of which only RAM cell 40(0) in row 0, RAM cell 40(1) in row 1, and RAM cell 40(N-1) in row N-1 are depicted. Up to a number M of such columns of RAM cells are included in RAM cell array 30, but such additional columns are omitted from FIG. 3 in the interest of clarity.

For each of the number N of rows in RAM cell array 30, row driver section 32 includes a set of row driver transistors that are interconnected as shown between a corresponding row access lead and a corresponding RAM cell in RAM cell array 30. One of each such set of row driver transistors is an n-channel keeper device 42 having a gate connected to receive isolate signal ISO from high-voltage logic section 18. Typical of such keeper devices, shown in FIG. 3 are keeper device 42(0) associated with row 0 of RAM cell array 30, keeper device 42(1) associated with row 1 of RAM cell array 30, and keeper device 42(N-1) associated with row N-1 of RAM cell array 30.

When memory circuit 10 is to commence a backup operation, before the periphery of RAM cell array 30 is powered down, isolate signal ISO is driven to a high logic 1 state that corresponds to input voltage $V_{dd3}$. Each of the n-channel keeper devices 42 is thereby turned on, holding each associated row access lead of RAM section 12 low. This prevents access to the RAM cells in that associated row of RAM cells in RAM cell array 30 and preserves the data state stored therein, until such time as the routine or normal mode of operation of memory circuit 10 is resumed.

For each of the number M of columns in RAM cell array 30, column access and precharge section 34 includes a precharge portion 44 and a column decode portion 46. Precharge portion 44 includes a plurality of precharge transistors interconnected as shown between internally-regulated low voltage $V_{dd}$ and a corresponding column of RAM cells in RAM cell array 30. Column decode portion 46 includes a plurality of column driver transistors interconnected as shown between RAM cell array 30 and data transmission bus DIO 26 so as to also receive potential column driver signals CLD.

In power selection circuit 36 of RAM section 12, a pair of power selection transistors is connected as shown to a respective one of input voltage $V_{dd3}$ and internally-regulated low voltage $V_{dd}$. The power selection transistors of power selection circuit 36 are interconnected as shown with and through a power selection inverter 36A so as to receive backup signal BKP from high-voltage logic section 18.

During normal operation of memory circuit 10, while internal LDO power supply regulator 16 is functioning, no backup signal BKP is presented from logic section 18, and power selection circuit 36 passes internally-regulated low-voltage $V_{dd}$ as power to RAM cell array 30. Thus, in the normal operation of memory circuit 10, the output of power selection circuit 36 and the array input voltage $V_{ddA}$ (FIG. 2), is equal to internally-regulated low-voltage $V_{dd}$.

On the other hand, when memory circuit 10 is to enter into a backup operation due to receipt of input backup signal BKP by high-voltage logic section 18 of FIG. 1, memory array backup signal BKA is generated by logic circuit section 18 and is directed to power selection circuit 36 as shown in FIG. 3. In response to memory array backup signal BKA, power selection circuit 36 switches internally-regulated low voltage $V_{dd}$ off as the power supplied to RAM cell array 30 and substitutes in place thereof input voltage $V_{dd3}$. Thus, during backup mode operation of memory circuit 10, the output of power selection circuit 36, array input voltage $V_{ddA}$ (FIG. 2), is equal to input voltage $V_{dd3}$.

Figure 4:
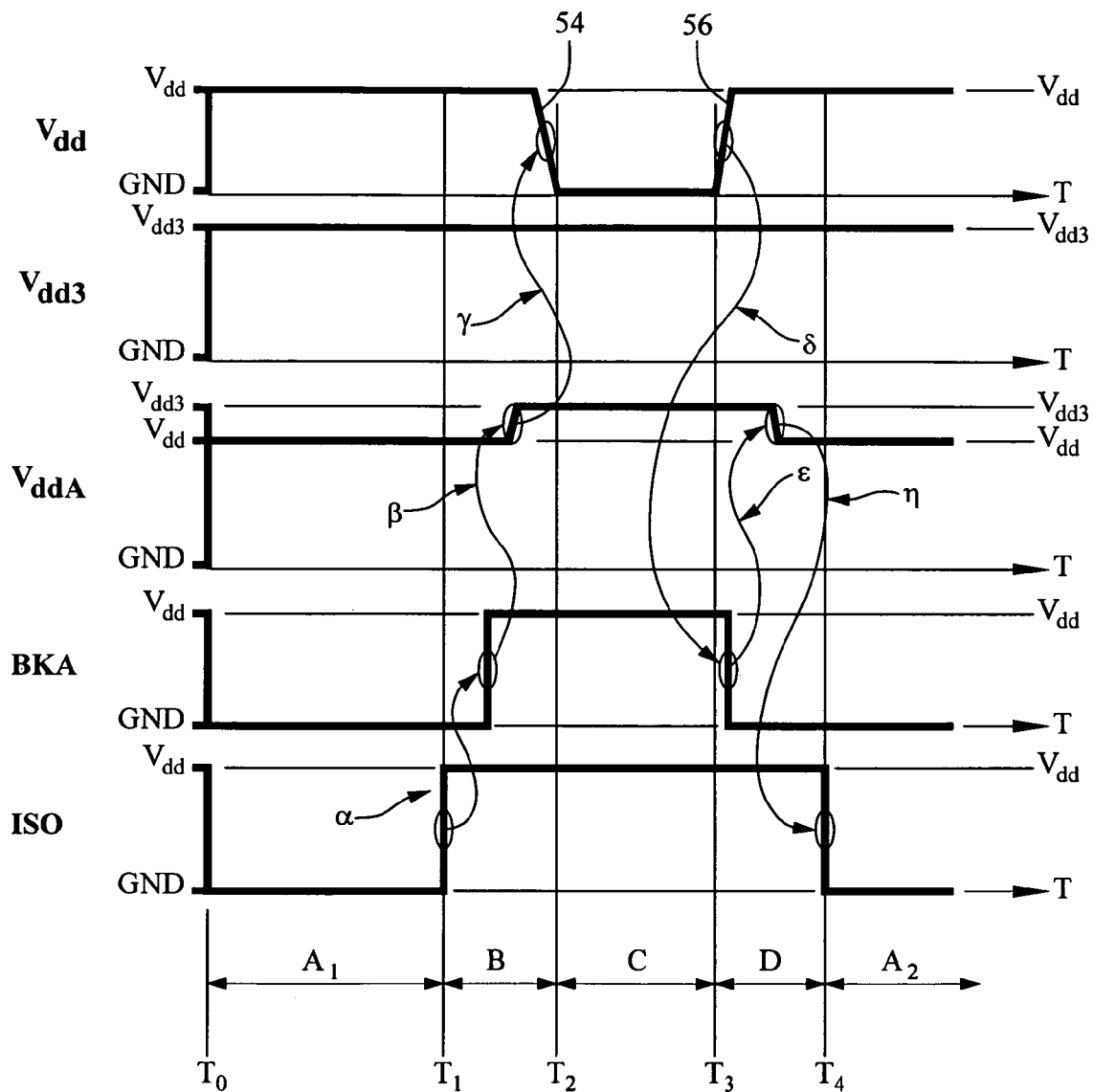
FIG. 4 is a diagram of waveforms that illustrate the backup mode of operation of the random access memory section of FIG. 2 to preserve memory cell data state with minimal charge loss according to this invention.

FIG. 4 diagrammatic view of signal time sequences of events that occur during the operation of memory circuit 10 in FIG. 1 according to this invention. In this respect, FIG. 4 discloses a plurality of waveforms that appear over time at various locations in memory circuit 10 as memory circuit 10 shifts into and out of backup mode operation. During backup mode operation, the supply of internally regulated low-voltage $V_{dd}$ to RAM section 12 is terminated and the data memory states present in RAM cell array 30 are preserved with minimal charge loss through the application of a higher voltage $V_{dd3}$ provided, for example, only to RAM section 12.

Each of the several waveforms in FIG. 4 includes a horizontal axis of changing time T that progresses in time to the right and a vertical axis of voltage that increases vertically from a ground state GND that also corresponds to logic 0. The waveforms are aligned according to time T such that at any specific moment during the illustrated operation of memory circuit 10, the simultaneous condition of each of respective waveforms is vertically aligned. These waveforms, in particular, depict the operation of memory circuit 10 during initial normal mode operation $A_1$, during backup mode operation C, and thereafter during resumed normal mode operation $A_2$. In the transition from initial normal mode operation $A_1$ to backup mode operation C, memory circuit 10 functions in backup-entry mode operation B. Similarly, during the transition from backup mode operation C to resumed normal mode operation $A_2$, memory circuit 10 functions in of backup-exit mode operation D.

At the topmost position in FIG. 4 is a waveform for internally regulated low voltage $V_{dd}$ that is supplied by internal LDO power supply regulator 16 to RAM section 12 during all periods of normal mode operation of memory circuit 10. During backup mode operation C, internally-regulated low voltage $V_{dd}$ is not needed in memory circuit 10. Therefore, internal LDO power supply regulator 16 is turned off.

Below the $V_{dd}$ waveform in FIG. 4 is a waveform for input voltage $V_{dd3}$. Input voltage $V_{dd3}$ is presented without interruption during all periods of operation depicted in FIG. 4 to internal LDO power supply regulator 16, to high-voltage logic section 18, and to power selection circuit 36 of RAM section 12. Nonetheless, input voltage $V_{dd3}$ is not employed to any purpose by internal LDO power supply regulator 16 during backup mode operation C.

At a medial position among the waveforms in FIG. 4 is a waveform for array input voltage $V_{ddA}$. Array input voltage $V_{ddA}$ varies over the periods of operation illustrated in FIG. 4 between internally-regulated low voltage $V_{dd}$ and input voltage $V_{dd3}$. During all periods of normal mode operation of memory circuit 10, array input voltage $V_{ddA}$ is equal to internally-regulated low-voltage $V_{dd}$. During backup mode operation C, however, array input voltage $V_{ddA}$ is equal to input voltage $V_{dd3}$.

Below the $V_{ddA}$ waveform, concluding the waveforms in FIG. 4, are pair of related control waveforms for signals BKA and ISO that allow high-voltage logic section 18 to operate RAM section 12 as required via memory circuit 10. When signals BKA and ISO are enabled, Signal RGN is applied to LDO 16 from section 18 to disenable its output $V_{dd}$ to RAM section 12.

The first, or upper, of these related control waveforms for signals BKA and ISO is a waveform for memory array backup signal BKA. Memory array backup signal BKA is generated in high-voltage logic section 18 in response to backup signal BKP from another source in memory circuit 10 or elsewhere in other circuitry. Memory array backup signal BKA is communicated to power selection circuit 36 in RAM section 12, causing array input voltage $V_{ddA}$ to change from internally-regulated low voltage $V_{dd}$ to input voltage $V_{dd3}$ for the duration of backup mode operation C.

The second, or lower, of these related control waveforms for signals BKA and ISO is the waveform for isolate signal ISO. Isolate signal ISO is generated in high-voltage logic section 18 and employed in row driver section 32 of RAM section 12 during backup mode operation C to isolate and, therefore, to preserve the data memory states in RAM cell array 30.

At a time $T_1$ shown in FIG. 4, at the termination of initial normal mode operation $A_1$, the process of shifting memory circuit 10 into backup mode operation C commences. Isolate signal ISO is asserted, assuming logic 1 state that corresponds to input supply voltage $V_{dd3}$. In effect, isolate signal ISO is a request that the data memory states in the RAM cells in RAM section 12 are to be isolated from access during forthcoming backup mode operation C.

In response, as indicated in FIG. 4 by an arrow α, memory array backup signal BKA is then asserted, assuming logic 1 state that corresponds to input supply voltage $V_{dd3}$. Substantially concurrent with this operation, memory array backup signal BKA is enabled to power selection circuit 36 of RAM section 12 to change the power source delivered to RAM cell array 30 from $V_{dd}$ to $V_{dd3}$. This is indicated by an arrow β where array input voltage $V_{ddA}$ rises from internally-regulated low voltage $V_{dd}$ to input voltage $V_{dd3}$.

As a result, as previously indicated, internally-regulated low voltage $V_{dd}$ is no longer required for RAM section 12, and internal LDO power supply regulator 16 is turned off via signal RGN. As indicated by arrow γ, the value of internally regulated low-voltage $V_{dd}$ diminishes from a logic state 1 corresponding to internally-regulated low voltage $V_{dd}$ toward ground state GND along a downward waveform incline depicted between T1 and T2 in FIG. 4 at backup entry mode operation B. Internally-regulated low voltage $V_{dd}$ is not provided for the duration of backup mode operation C.

At a time $T_2$, backup mode operation C ensues in memory circuit 10 as depicted in FIG. 4.

At a time $T_3$ at the end of backup mode operation C, memory circuit 10 commences to shift toward exiting backup mode operation C, and backup-exit mode operation D ensues. Internal LDO power supply regulator 16 is reactivated by the reassertion of regulator enable signal RGN by high-voltage logic section 18 in FIG. 1. Internally-regulated low voltage $V_{dd}$ reappears in memory circuit 10, and increases from a logic 0 ground state GND along an upward waveform incline 56 to logic 1 state that corresponds to internally-regulated low voltage $V_{dd}$.

Then, as indicated by arrow δ, memory array backup signal BKA is withdrawn by high-voltage logic section 18, dropping from a logic state 1 corresponding to input supply voltage $V_{dd3}$ to logic 0 corresponding to ground state GND. Power selection circuit 36 of RAM section 12 switches the power to RAM cell array 30 from input voltage $V_{dd3}$ to internally-regulated low voltage $V_{dd}$, as indicted by arrow ε, and the waveform for array input voltage $V_{ddA}$ is, correspondingly downwardly to a value $V_{dd}$. This event advises memory circuit 10 that normal operating power has been restored.

Next, as indicted by arrow η, isolate signal ISO is unasserted by high-voltage logic section 18, dropping from a logic 1 state corresponding to input supply voltage $V_{dd3}$ to a logic 0 ground state GND. Time $T_4$ marks the end of backup-exit mode operation D with the resumption of or resumed normal mode operation $A_2$ as indicted after time $T_4$.

The foregoing description of the present invention has been provided for purposes of clarity and understanding. The description is not, therefore, intended to limit the present invention to the precise form disclosed. Various modifications to that description are possible without departing from the scope of the present invention or the range of equivalence appropriate thereto.

What is claimed is:

1. A method of providing power to a volatile circuit when its primary power source is inactivated, comprising:
   providing a first power signal from the primary power source to the circuit to maintain volatile states of the circuit during a first mode of operation;

terminating the first power signal to the circuit in preparation of transferring to a second mode of operation;

providing a second power signal having a different power value from the first signal to the circuit substantially concurrently with the inactivation of the first power signal to commence the second mode of operation;

inactivating the second power signal to the circuit in preparation of returning to the first mode of operation; and providing the first power signal to the circuit substantially concurrently with the inactivation of the second power signal during the return to the first mode of operation.

2. The method of claim 1 wherein the first mode of operation is a normal mode of operation.

3. The method of claim 1 wherein the second mode of operation is a backup or standby mode of operation.

4. The method of claim 1 comprising the step of providing the second power signal value to be larger than the first power signal value.

5. The method of claim 1 wherein the volatile circuit is a memory circuit.

6. The method of claim 5 wherein the memory circuit is a random access memory (RAM).

7. The method of claim 1 wherein the second power signal comprises two signals, a first signal to isolate the circuit from any peripheral circuits operating at the first power signal value and a second signal to provide power at the second power value to the circuit during the second mode of operation.

8. A circuit that contains circuit elements that have volatile states that are lost without continued application of power to the circuit elements holding the volatile states, comprising:

a power selection circuit coupled to the circuit elements having a plurality of selectable modes;

a first mode selected when the volatile state circuit elements are to be operated in a first mode of operation that includes a primary power source for continually holding the circuit element volatile states at a first power level;

a second mode selected when the volatile state circuit elements are to be operated in a second mode of operation for continued holding the circuit element volatile states at a second power level while the primary power source is non-operational.

9. The circuit of claim 8 wherein the first and second selected modes provide different power values to the circuit elements to maintain the circuit element volatile states where one power value is a higher power level from the other power value.

10. The circuit of claim 8 wherein one of the selected modes provides for both power isolation of some of the circuits from circuits that include volatile state circuit elements and maintains power to the volatile data circuit elements so that their volatile states are preserved as previously set during the operation of the volatile state circuit elements in the other selected mode.

11. The circuit of claim 8 further comprising a power switch to provide first and second mode selection, the switch providing the first power level to the volatile circuit elements when enabled during the first mode of operation and disenabled during the second mode of operation.

12. The circuit of claim 11 wherein the power switch comprises a low dropout (LDO) circuit.

13. The circuit of claim 11 further comprising a logic circuit to enable and disenable the power switch, respectively, during the first and second mode of operation.

14. The circuit of claim 13 wherein the logic circuit provides power to the volatile state circuit elements at the second level during disenabling of the power switch.

15. The circuit of claim 14 wherein the logic circuit provides an isolation signal to electrically isolate peripheral circuits from the volatile state circuit elements during the second mode of operation.

16. The circuit of claim 15 wherein the peripheral circuits operate only at the first power level as enabled by the power switch and the volatile state circuit elements operate at both the first and second power levels.

17. The circuit of claim 16 wherein the logic circuit enables the isolation signal for the volatile state circuit elements and a second power level signal to the volatile state circuit elements while disenabling the power switch.

18. A memory device comprising:

a memory circuit containing volatile memory cells, each cell having a plurality of temporal memory data states;

peripheral circuits surrounding at least a portion of the memory circuit for control, power and operation of the memory circuit cells;

a power selection circuit couple to the memory circuit cells having a plurality of selectable modes;

a first mode of operation selected when the memory circuit cells are to be operated at a first power level to maintain their selected states;

a second mode of operation selected when the memory circuit cells are to be operated at a second power level when at least some of the peripheral circuits are in an inactivated state and power at the first power level to the memory circuit cells is discontinued;

selection from the first mode to the second mode to provide power to only the volatile memory cells to preserve their current memory data states.

19. The memory device of claim 18 wherein the memory states are binary states.

20. The memory device of claim 18 wherein the second selected mode has a larger power level than the power level of the first selected mode.

21. The memory device of claim 18 wherein the memory circuit is a random access memory (RAM).

22. The memory device of claim 18 further comprising a logic circuit that provides a first signal during the first mode of operation that enables a first power signal to operate the memory circuit cells at the first power level and a second signal during a second mode of operation that enables a second power signal to operate the memory circuit cells at the second power level.

23. The memory device of claim 22 wherein the logic circuit further includes an isolation signal to electrically isolate the peripheral circuits from the memory circuit cells during the second mode of operation.

24. The memory device of claim 23 wherein the second power level is a larger voltage than the first power level.

* * * * *